United States Patent [19]
Buckler et al.

[11] 3,751,656
[45] Aug. 7, 1973

[54] FLEXIBLE PLASTIC FLASH ILLUMINATION DEVICES WITH SOLID PYROTECHNIC MATERIAL

[75] Inventors: Sheldon A. Buckler, Lincoln; David P. Kennedy, Cambridge; Kenneth S. Norland, Belmont, all of Mass.

[73] Assignee: Polaroid Corporation, Cambridge, Mass.

[22] Filed: Jan. 10, 1972

[21] Appl. No.: 216,467

[52] U.S. Cl. .................... 240/1.3, 95/11.5, 431/93, 431/95
[51] Int. Cl. .............................................. G03b 15/02
[58] Field of Search ............................ 240/1.3, 2 C; 95/11.5; 431/92, 93, 95, 96; 102/32

[56] References Cited
UNITED STATES PATENTS

| | | | |
|---|---|---|---|
| 2,279,880 | 4/1942 | De Margitta | 431/95 |
| 2,289,876 | 7/1942 | De Margitta | 431/93 |
| 2,003,660 | 6/1935 | Yamaguchi et al. | 431/93 X |
| 3,614,413 | 10/1971 | Beach | 240/1.3 |

*Primary Examiner*—Richard L. Moses
*Attorney*—Robert M. Ford, Stanley H. Mervis et al.

[57] ABSTRACT

Flash illumination devices are formed of transparent sheet plastic wherein a pair of opposed walls are marginally secured together to provide a cavity for retaining pyro-technic material. The pyrotechnic material comprises a combustible material and a solid oxidant. Ignition means are associated with the flash devices.

18 Claims, 21 Drawing Figures

PATENTED AUG 7 1973 3,751,656

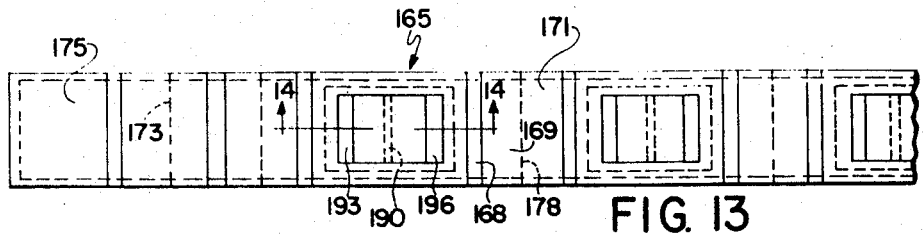
FIG. 13
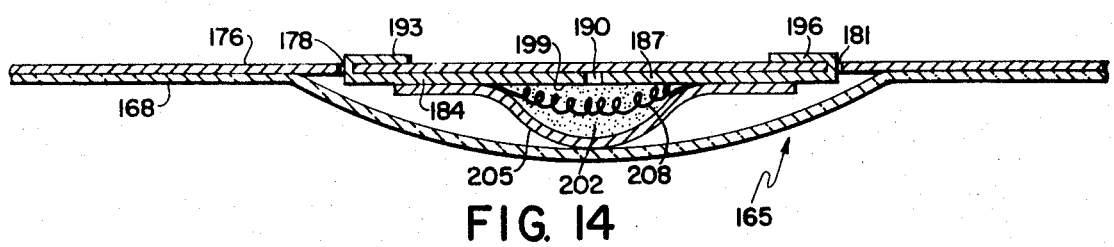
FIG. 14
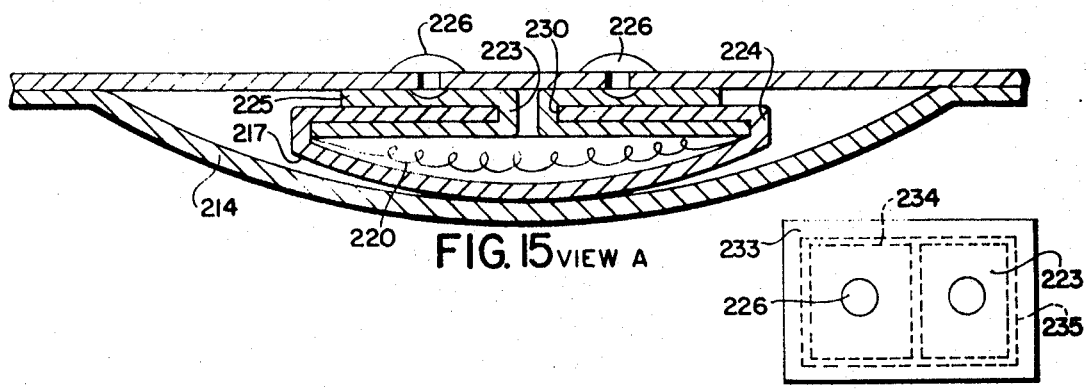
FIG. 15 VIEW A
FIG. 16 VIEW A1
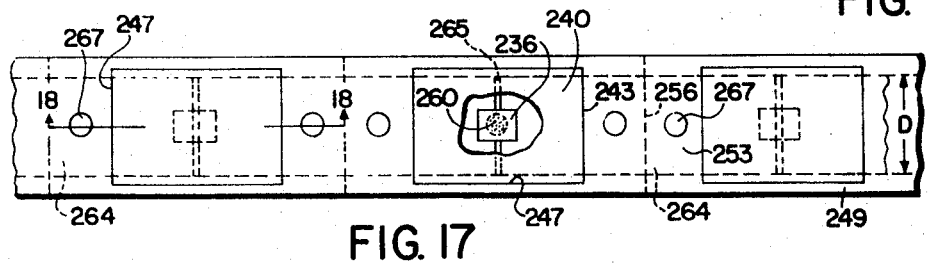
FIG. 17
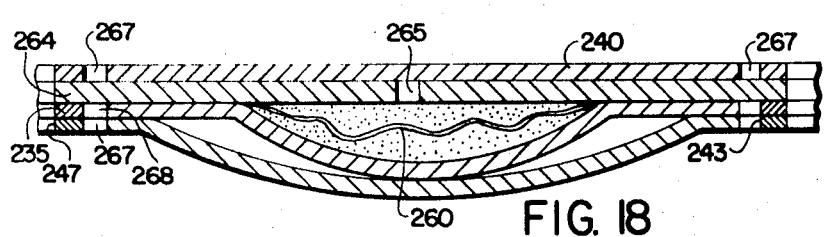
FIG. 18

FLEXIBLE PLASTIC FLASH ILLUMINATION DEVICES WITH SOLID PYROTECHNIC MATERIAL

BACKGROUND OF THE INVENTION

The concept of providing flash bulbs constructed of flexible, plastic envelopes containing pyrotechnic materials is known to the art. For example, U. S. Pat. to DeMargitta No. 2,254,888, issued Sept. 2, 1941, shows a flexible casing such as cellulose acetate filled with, e.g., oxygen and magnesium wires. Upon ignition, the casing expands. Other U. S. Pat. Nos. showing similar concepts are Kaprelian 2,981,008 issued Apr. 25, 1961; Rieber et al., 3,283,749 issued Mar. 8, 1966; and Jakob 3,263,068 issued July 26, 1966.

In this connection, various concepts for incorporating pyrotechnic materials on tapes for flash bulb purposes, i.e., adapted to be fed into a flash attachment on a camera on a sequential basis, are shown in the patents to S. Ostrow U.S. Pat. No. 3,232,194 issued Feb. 1, 1966 and U.S. Pat. No. 3,280,601 issued Oct. 25, 1966.

A novel flash illumination device comprising flexible transparent plastic has now been found which is not susceptible to the deficiencies of the prior art.

SUMMARY OF THE INVENTION

The present invention is directed to a flash illumination device comprising transparent sheet plastic having at least a pair of opposed walls marginally secured together to provide a cavity adapted to retain pyrotechnic material comprising a combustible wire or powders such as aluminum, magnesium or zirconium wire, and a solid oxidant. Ignition means are provided to initiate combustion of the pyrotechnic materials.

In a preferred embodiment, at least a first and second wall is provided wherein the inner wall comprises a thermally stable polymeric material and the outer wall a heat-shrinkable plastic.

In an alternative embodiment, the flash illumination devices are constructed of continuous seamless plastic tubing of either single or multiwall thickness, i.e., tubes in the form of flattened sleeves may be segmented into individual packets comprising an inner and an outer envelope having a predetermined size relationship.

BRIEF DESCRIPTION OF THE DRAWINGS

The terms "front" and "rear" are used relative to a camera body:

FIG. 10 is a section through 10—10 of FIG. 9;

FIG. 10a is a modification of FIG. 9 in cross section;

FIG. 10b is a top view of the modification of FIG. 10a;

FIG. 13 is a rear view of an articulate series of flash illumination devices illustrating principles of construction found in the preceding figures of the drawing, but particularly modified for electrical ignition;

FIG. 14 is a section through 14—14 of FIG. 13;

FIG. 15 is a section similar to FIG. 14 but showing a modified construction for the electrical contact terminals;

FIG. 16 is a rear view of an individual flash illumination device constructed in accordance with FIG. 15;

FIG. 17 is a front view, partially broken through the outer envelope, of one of a series of flash illumination devices to show continuous construction of a strip or sleeve of foldably related flash devices having a further modified arrangement for electrical contact; and FIG. 18 is a section on the lines 18—18 of FIG. 17.

DETAILED DESCRIPTION OF THE INVENTION

Figure 1:
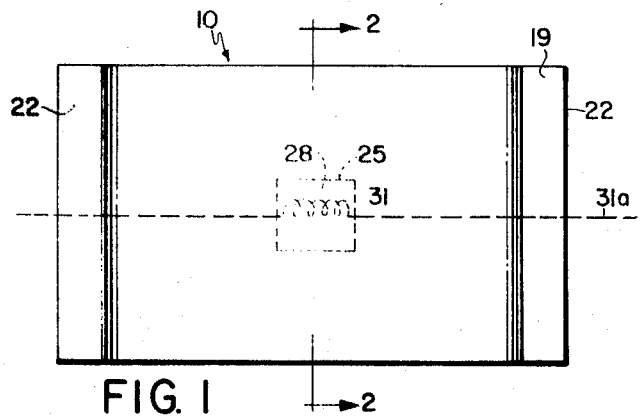
FIG. 1 is a front view of an individual flash bulb within the scope of the present invention.

The present invention is directed to a novel flash illumination device configuration comprising an envelope formed of a flexible transparent sheet plastic having at least a pair of opposed walls marginally secured together to form said envelope and to provide a cavity for retaining pyrotechnic material. Thus, the flash device may be composed of two sheets of flexible transparent plastic retaining the pyrotechnic material and marginally sealed at all four edges, thus forming the pyrotechnic retaining envelope.

The invention readily lends itself to flash device constructions wherein the flash devices are individual wafers or packets, or articulated in a series of a dozen or more, joined by sealed margins in a strip or roll having fold lines and tear lines. A strip of such packets can be compactly folded in accordian-pleated arrangement for packaging in a camera mounted cartridge to be pulled out one at a time as needed.

By virtue of the use of heat-sealable seamless tubular plastic film materials as the main body of a series of flash devices in a manufacturing process, mass production is obtainable in accordance with known methods using heat sealing, thermal welding, severing, etc. Further, such manufacturing methods effecting a process of applying pyrotechnic materials in spaced array also lends itself to providing a continuous or discontinuous backing in the tubular body of heat sink and light reflecting material such as aluminum film or foil, or other thin metallic sheet material.

The construction has further inherent advantages in that fairly simple apparatus for handling and igniting the flash illumination devices is possible, utilizing holders which may be constructed to effect heat sinks and reflectors.

A further inherent advantage of the use of a continuous tubular construction for a series of flash devices is the fact that they may be constructed for electrical or percussion type ignition wherein the main materials such as the tubular or sleeve body and pyrotechnic material remain the same for either type.

The flexible, transparent sheet plastic employed in the present invention must possess sufficient short term thermal stability to confine the combustion and remain intact during the period when the temperature may reach 3000° K., e.g., dissipation of energy by charring. The material must be optically transparent during the combustion but may darken subsequent to combustion of the pyrotechnic material, but must retain sufficient mechanical strength to retain the gases and other products of combustion. It should be understood that the above requirements may be satisfied by a single material or by a combination of two or more materials employed in various configurations.

In a particularly preferred embodiment, the flash device comprises a multiwall envelope comprised of an inner and an outer wall wherein the inner wall comprises a thermally stable polymeric material and the outer wall a heat-shrinkable polymeric material. The purpose of the multiwall structure is to provide thermal resistance, e.g., to 3000° K., by means of the inner wall to prevent "burn through" and mechanical strength by means of the outer wall to retain the gases and other products of combustion. The inner wall only need be coextensive in area with the pyrotechnic material. In an alternative embodiment, the heat shrinkable polymeric material may be employed as the inner wall and the outer wall the thermally stable material.

As examples of suitable thermally stable polymers, mention may be made of polyamides, polyesters, polyimides, polycarbonates, polybenzimidazoles and dibenzimidazoles, polyoxadiazoles, polybenzoxazoles, polybenzothiazoles, polysulfones, polyphenylene oxides, polyvinyl chloride, polyvinylidene chloride, silicones, phenol and melamine formaldehyde resins, epoxies and aliphatic esters and ethers of cellulose.

The above materials may be homopolymers or copolymers and may be aromatic or mixed aromatic-aliphatic structures to build in a little more flexibility and may contain various levels of appropriate plasticizers for the same reason.

As examples of suitable heat-shrinkable polymeric materials, mention may be made of polystyrene, polyvinyl chloride, polyethylene, biaxially oriented polyethylene, polypropylene, polyvinylidene chloride, polyesters, poly-urethanes and copolymers thereof.

It should be understood that various reinforcing means may be employed in the polymeric materials, e.g., natural or synthetic fibers. Preferably, a braided coat of glass or dacron fibers are employed integral with the polymeric material. It should be understood, however, that reinforcing means are not employed to the extent that the film loses its flexibility.

The pyrotechnic material employed preferably comprises a solid oxidant and a combustible material. The solid oxidants may comprise, e.g., sodium chlorate, potassium perchlorate, chromates, peroxides, and the like. A preferred solid oxidant is potassium perchlorate. The combustible material is preferably metal foil or powders such as aluminum, zirconium, tungsten, or magnesium, or other ignitable material.

The terms "pyrotechnic material" as used herein is intended to refer to materials which chemically react to produce a high intensity light emission for a short duration.

By employing a solid oxidant, it is possible to eliminate the need for a gaseous atmosphere and the attendant pressure restraint which is required in prior art flash bulbs. The present invention provides a flash bulb with a small initial volume and with retaining means that need only possess short term thermal resistance and sufficient mechanical strength to retain the pyrotechnic material and which will be clear and transparent at least during combustion.

In a particularly preferred embodiment, polyvinyl chloride in the form of seamless tubing (available commercially as Tygon, Norton Company, Akron, Ohio) as the transparent plastic material is employed.

The following non-limiting example illustrates the novel flash illumination device of the present invention.

EXAMPLE

Pyrotechnic material comprising 35 mg. of zirconium powder (Metal powder 120-A, Foote Mineral Company) and 35 mg. of potassium perchlorate (Malkinkrodt Chemical Company) was disposed in 4.5 cm section of Tygon tubing Formulation R-3603 (one-quarter in. I.D.; three-eighth in. O.D.) The tube section employed had an expanded volume of 1 cc. but was flattened and sealed at the edges. The firing wire was 47 gauge tungsten alloy and the lead wire connecting to an electrical source was 27 gauge copper. No binder was employed with the pyrotechnic mixture. Ignition of the flash illumination device showed a time of flash of 1.4 milliseconds and an integrated light intensity (measured by taking the total area under an oscilloscope trace of the flash) of 51. The duration of the flash is faster by a factor of about 8 compared with a commercially available AG-1 flash bulb. Thus, the flash devices of the present invention would find particular utility in high speed photography.

It will, of course, be understood that tubing other than clear may be usable where it is desired to get a filtering effect or a monochromatic effect. In that connection, sheet plastic of proper hue for filtering effect or monochromatic effect can be inserted between the inner and outer envelopes of a flash devices at the front side. If desired, suitable binders may be employed in the pyrotechnic mixture.

Figure 2:
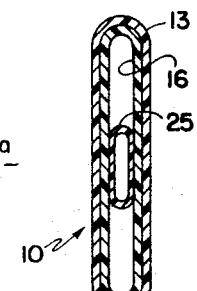
FIG. 2 is a section through 2—2 of FIG. 1.

Referring to FIGS. 1 and 2, one type of construction for a flash device within the scope of the present invention comprises an outer envelope 10 which may consist of a plurality of laminations such as 13 and 16, and as shown, is made of continuous plastic tubing sleeves such as polyvinyl chloride inserted one within the other and flattened, being preferably exhausted of air. The ends of the outer envelope are pressed flat and heat sealed at margins 19 giving fully closed edges 22 at each end with a minimum of free space within the envelope. Centrally carried within the outer envelope is a similarly constructed inner envelope 25 which likewise may be of tubular and laminated construction consisting of polymethyl methacrylate with heat sealed margins enclosing conventional pyrotechnic material 28 which will be understood to comprise combustible and solid oxidant ingredients. An ignition filament of firing wire 31 of conventional type is within the inner envelope 25, its ends 31a extending externally of the packet and being sealed in the margins of the envelopes. It is preferred to exhaust the outer envelope to reduce expansion due to heating of air upon flashing of the device thereby reducing expansion of the packet itself.

The tubular materials from which the flash device is fashioned are, of course, transparent for usual purposes and of suitable physical and chemical characteristics as to withstand the effects of the flashing pyrotechnic material 28, which can be powder, wires, or a pellet.

Figure 3:
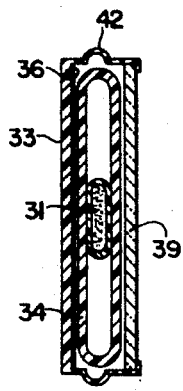
FIG. 3 is a cross section showing one mode of holding a flash illumination device of the general construction of FIG. 1 in place for igniting.

FIG. 3 shows a holder 33 in its essentials for a flash device 34 of the present invention, although in this case the flash device consists of inner and outer tubular envelopes of but a single lamination as shown. The holder may be made of plastic, stamped, or die cast metal etc., comprising an open ended channel holder 33 having a generally rectangular front shape and a reflective inner surface 36 and holding a front glass 39, which may be a condensing lens, if desired. Further, holder 33, if formed of suitable thin and flexible materials, can have formed around the periphery thereof an expandable pleat 42 which can readily flex outwardly in bellows fashion to relieve any expansion of the flash device upon combustion. However, since gaseous oxidants are not employed, and free space within the envelope is at a minimum, expansion is minimized. The flash device may be an individual unit simply inserted between the glass member 39 and the surface 36 with suitable arrangement being made for effecting electrical contact or other means for ignition.

Figure 4:
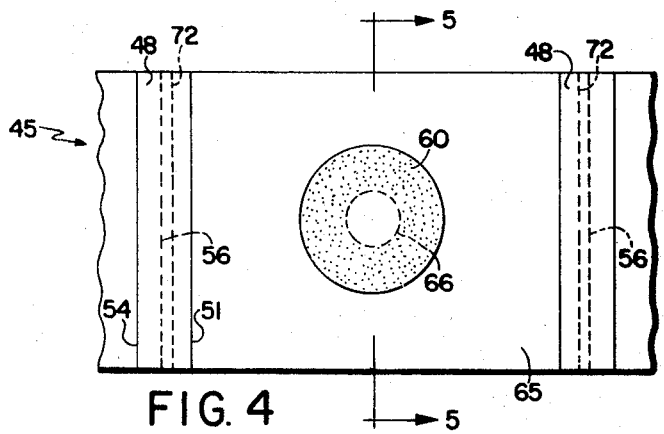
FIG. 4 is a front view of another type of a flash illumination device ignitable by percussion, one of a series of such flash devices made from a length of seamless tubing, the flash devices being joined to each other by foldable panels.
Figure 5:
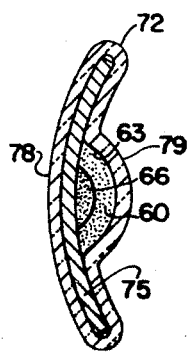
FIG. 5 is a section through 5—5 of FIG. 4.

FIGS. 4 and 5 show a portion of a continuous flash device, one flash device 45 being illustrated joined by foldable end margins sealed as flat panels, such as 48, having indented fold lines such as 51 and 54 to adjoining packets, and having a perforate tear line 56.

The pyrotechnic material, for example, a powder 60, is enclosed in a circular cavity 63 formed by thermal welding of the remaining area of the front and rear walls of the respective packet envelope 64, in this instance the welding being to a metallic member, as later described.

Incorporated within the pyrotechnic material is a small quantity of primer material 66. This may be inserted as powder or pellet through a small and subsequently sealed aperture at the back of the packet, as a final manufacturing step, the rear wall and any metallic backing being pierced for such purpose.

The primer otherwise may be introduced in an intermediate step in the form of a pellet held in relatively fixed position as by a dot of cement (not shown) to the inner surface of the rear wall of the envelope.

Incorporated as a lamination between the front and rear walls of the envelope is an aluminum foil backing or metallic strip 75, which runs continuously through the series of flash bulb packets and which may be plastic coated or treated with cement to effect welded sealing between the inner and outer walls and at the margins 48 except for cavity 63.

The sleeve strip is welded between suitably shaped surfaces so as to give a predetermined curvature for reflective purpose, for example, parabolic, as shown in FIG. 5.

The aluminum foil backing may be individual panels from margin to margin for respective packets if there is objection to heat transfer between packets. In any event, such foil backing, which can be of any desired thickness, effects a heat sink and a reflective medium, and depending upon thickness, can also effect considerable structural strength for holding a desired light focusing curvature.

Where the primer material is extremely sensitive or the pyrotechnic material is extremely sensitive, individual aluminum backing panels would be indicated since conduction from packet to packet causing pre-ignition or sympathetic ignition could conceivably occur. However, where heat dissipation is not a problem, metal backing within the envelope may be eliminated and the inner back wall of the envelope provided with a reflective, i.e., mirror finish, by known methods, e.g., vacuum deposition of a suitable reflective material.

While a plurality of laminations have been described, a single laminated envelope will suffice, preferably utilizing a pyrotechnic material consisting of wires or powder.

Any suitable impacting of the primer can be arranged. For example, a flash device of the kind shown in FIGS. 4 and 5 can be individually inserted, or used as a strip by being pulled through one at a time in a slot-like arrangement as shown in FIG. 3 with a firing pin movable through an aperture in the rear wall of holder 33. Such firing pin would strike the rear of the bulb at a central area 78 adjacent primer 66, as in FIG. 5. The front portion 79 would be supported against front glass 39 (FIG. 3) to serve as a reaction support and the flash device would then be ignited by the impact against the rear wall at the primer area. In an apparatus generally along the lines shown in FIG. 3 it would, of course, not be necessary to have a reflective back surface 36 since the aluminum foil in the flash device would serve that purpose, although the back formation might be curved to smoothly fit the rear surface of the flash device, not only for secure holding but also for heat dissipation.

Figure 6:
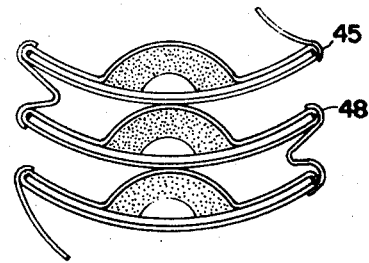
FIG. 6 is a general presentation of a mode of accordian pleated folding of a series of flash illumination devices.
Figure 7:
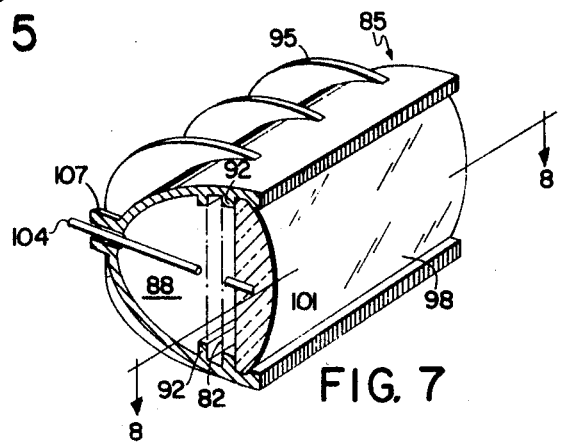
FIG. 7 is a general presentation in perspective and cross section of apparatus for holding and impacting percussion type flash illumination packets.
Figure 8:
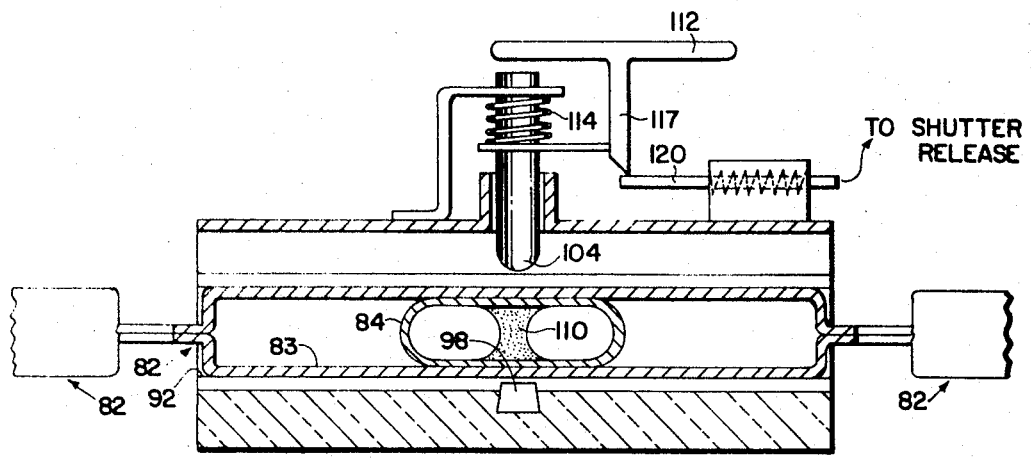
FIG. 8 is a section on the line 8—8 of FIG. 7.

FIG. 6 represents a series of flash illumination devices of the general form shown in FIGS. 4 and 5 articulated to each other by means of the heat welded planels 48 foldable at both edges to adjoining flash devices, thus forming an accordian-pleated and compact package. Such panels may be formed with a median weakened line 56, as by perforations, for tearing off after use of individual flash devices in a well known manner, as hereinabove mentioned. For continuous feeding of a strip of flash devices, an apparatus as shown in FIGS. 7 and 8 is usable. In such instance, flash devices 82 (shown in phantom in FIG. 7) made of outer envelopes 83 and inner envelopes 84, oriented as to their tubular axes at 90° to each other (FIG. 8) are marginally articulated as shown in FIG. 6.

Such a strip can be pulled through housing or holder 85 having a rectangular front with a parabolic rear wall contour for reflective purposes provided with a reflective inner surface 88. The flash devices are guided at their upper and lower edges by channels 92 which may be formed integral with holder 85, for example, in a die cast or plastic molded construction. The holder is provided with heat radiating flanges 95 at its back.

The front of the holder 85 is closed by a rectangular condensing bar lens 98. A fixed anvil pin 101, which is carried at the rear center of the lens extending into the housing coacts with a movable firing pin 104 having suitable slidability in a bearing collar 107 integral with the housing. Thus, when a flash device is suitable pulled through the housing, and primer 110 (FIG. 8) aligned between the pins, impetus given to pin 104 backed by anvil pin 101 on the other side of the flash device will ignite the primer. In this instance, the primer 110 extends from the front to rear in the center of the flash device 82 as illustrated in FIG. 8. The flash device may comprise an inner and outer envelope of the general type described hereinabove in connection with FIGS. 1–6. Other flash device constructions using a single envelope of one or more laminations can be utilized in an apparatus such as shown in FIGS. 7 and 8.

Particularly referring to FIG. 8, an exemplary arrangement for feeding flash devices from a continuous strip is fragmentarily illustrated, the feed being either from left to right or right to left by manually pulling the strip through the guide channels 92. Firing pin 104 may be manually cocked as by handle 112 to compress a spring 114 held by latch 117 integral with handle 112 and engaging a trigger pin 120 normally biased to the left and released by being pulled to the right, for example, as by being coupled to the shutter release (not shown).

Figure 9:
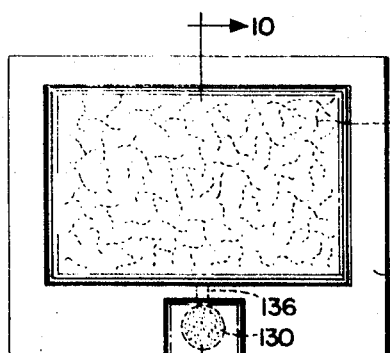
FIG. 9 is a front view of an individual flash illumination device of the percussion type having a modified primer arrangement.
Figures 10, 10A, 10B:
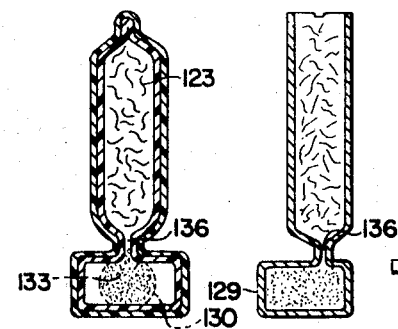

FIGS. 9 and 10 show a somewhat different construction for a percussion type of flash device. Here a pair of laminated tubular envelopes have pyrotechnic wire material 123 sealed within. A thermally welded margin 127 has a bulbous portion 129 effecting a small cavity 130 for holding a primer material 133. Thus the primer material protrudes outwardly of margin 127 on both sides of the flash device readily accessible to a firing pin in any suitable apparatus. Alternatively, the bulbousness 129 for holding the primer material can be formed on only one wall of the flash device leaving the opposite wall of the margin substantially flat as shown in FIG. 10a. In either case a small passage 136 is provided between the primer cavity and the remainder of the interior of the flash device for passage of igniting flame from the primer. The protuberance may be either rectangular having flat walls or rounded as shown in FIG. 10b.

Figure 11:
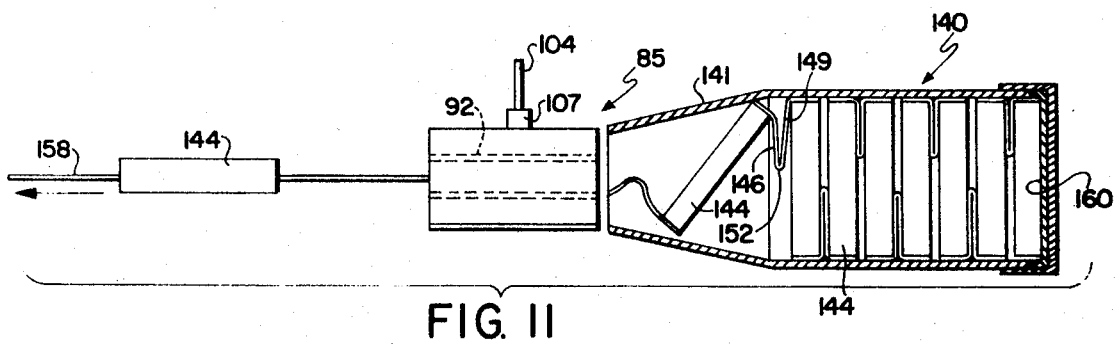
FIG. 11 is an overall top view showing apparatus of the type illustrated in FIGS. 7 and 8, in conjunction with a flash illumination packet holding cartridge shown in section having a series of foldably articulated flash illumination devices therein.

FIG. 11 shows apparatus as generally illustrated in FIGS. 7 and 8 and using the same reference characters for holding and igniting flash devices in conjunction with a cartridge 140 which may be of plastic or metal and preferably has a tapered rectangular front opening 141. The cartridge holds a series of articulated flash devices 144 having intermediate marginal joining panels 146 and 149 of fairly substantial length to permit finger gripping to pull each flash device in the direction of the arrow from the cartridge into the guides 92 of holder 85. The panels are joined by a fold line 152 to each other and by fold lines such as 155 to respective flash devices at the front and rear edges thereof. Thus, an accordian-pleated construction is effected whereby a compact arrangement of flash devices may be inserted in a cartridge with an integral pull tab 158 made by heat welded flattening of a portion of the sleeve at the leading end, for starting the feed operation. The flash device 144 to the left of holder 85 has been ignited, and a flash device shown in phantom in the holder is in position for igniting. The combined length of panels 146 and 149 is sufficient (about 1½ inches) to be finger gripped upstream of each flash device for pulling each flash device in turn.

The flash devices are folded in compact assembly and inserted in the cartridge 140 with the pull tab 158 extending, prior to application of a frictional or threaded end cap 160. It will, of course, be understood that suitable components (not shown) are provided to hold the cartridge 140 and holder 85 in proper fixed position relative to each other on a camera. Subsequently, the pull tab is first fed between the guide channels 92 until it emerges at the other side of the holder and then each flash device in turn brought into position as required for flashing.

While not shown, it will be understood that the pulling of the flash device strip through the housing in intermittent fashion can be used to cock the spring 114 (FIG. 8) for the triggering of each flashing by means of firing pin 104.

Figure 12:
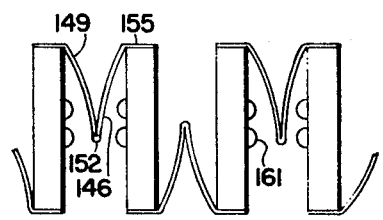
FIG. 12 is a portion of an articulated series of flash illumination devices having accordian pleated connecting panels wherein the flash devices are intended for electrical ignition.

Percussion type flash illumination devices can be used of the kind previously described, for example, in FIG. 8, and electrical ignition flash devices may also be used in an accordian-pleated arrangement as shown in FIG. 12 wherein contacts such as copper rivets 161 protrude at the rear of each flash device. This and other electrical contact means may be used which will be described.

Figure 14A:
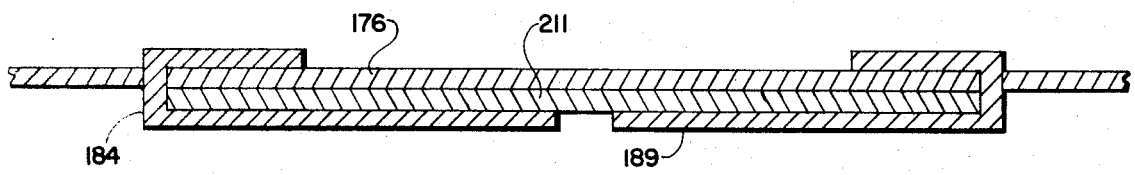
FIG. 14a is a modification of FIG. 14 in cross section.

FIGS. 13 and 14 show the rear of a strip of flash devices constructed of a tubular envelope 165 having thermally welded margins such as 168 to form rectangular flash bulbs in a continuous strip joined by fold panels such as 169 and 171 with a fold line 173 therebetween. The leading edge of the strip is provided with a pull tab 175 to initiate the feed from a cartridge such as 140 (FIG. 11). The rear wall 176 of the flattened tubular construction is slitted as with a pair of parallel slits 178 and 181 and in each said slit is foldably disposed a panel of aluminum foil, or thin sheet metal aluminum, or other suitable conductive material, such as the panels 184 and 187. The panels are gapped as by a gap 190 at their adjoining edges within the envelope and are folded over on the back of the envelope to form external contact surfaces outside the flash device such as the tabs 193 and 196 for connection to a voltage source in a camera. The aluminum or metal material is thermally welded by known methods or cemented to the inner surface of the wall and thus forms a pair of electrically isolated metallic electrodes which, however, have a reflective surface such as 199 facing front. The metal also serves as a heat sink when a pyrotechnic material within the cavity 202 is ignited.

Such cavity 202 is formed by a plastic membrane 205 which may be of the same material as the flash bulbs 165 and thermally welded or cemented to the aluminum or metallic components and preferably overlapping the ends of the gap therebetween so as to completely seal the cavity 202 as well as the edges of the metal. A wire ignition filament 208 is within the cavity and has ends which extend between the membrane and respective metallic plates or foils so as to intimately and electrically engage the foils and be sealed within the contiguity between the foils and the membrane. Thus, a voltage across external tabs 193 and 196 will ignite filament 208 to set off the flash within the cavity, all as will be apparent from FIG. 14.

If desired, a cushioning material (FIG. 14a) may be placed between the metallic panels 184 and 187 and the rear wall 176 of the flash device to cushion any expansion during flash occurrence. Such cushioning material may consist of a pad 211 of polyurethane foam of about the same or greater thickness than the plastic material of the envelope, all thicknesses being fractional inch, e.g., of the order of one-sixteenth inch.

Another construction for electrical ignition is shown in FIGS. 15 and 16 in which there is an outer envelope 214 and an inner envelope 217, of tubular plastic material. The inner envelope holds pyrotechnic material and an ignition filament 220 whose end wires 221 extend along the rear wall 222 of the inner envelope and into intimate contact within folds of aluminum foil, or thin sheet metal members 223. Each such metal member passes through a slit such as 224 in the back wall of the inner envelope and is thermally welded thereto, and to the rear wall of the outer envelope, with one leg such as 225 in intimate contact with a respective rivet such as 226 carried by the rear wall of the outer envelope. Thus the metallic members pass through respective slits in the inner envelope and the entire arrangement is fully sealed as by thermally welding with or without plastic or cement coating in between the meeting surfaces of the metal and the rear walls of the envelopes in a laminar construction. In this instance the laminating of the aluminum member legs and the wall of the inner envelope may give sufficient cushioning effect or if necessary a plurality of convolutions of aluminum foil may be used for such purpose between the inner and outer envelopes. Each flash device may be individually formed with the usual sealed margin 233 passing therearound as shown in FIG. 16, and the peripherally welded margins 234 and 235, top and bottom, respectively of the inner envelope. It will be noted that in this instance, as in FIG. 8, the tubular axis of the outer envelope is in the plane of the paper while the tubular axis of the inner envelope as seen in FIG. 15 is normal to the paper, and in the plane of the paper but normal to the outer envelope axis as viewed in FIG. 16. This is a matter of choice, except that where flash devices are made in a continuous strip, there may be a manufacturing convenience in having the axes of the outer and inner envelopes parallel, as generally illustrated in FIGS. 2 and 3.

FIGS. 17 and 18 show an arrangement similar to that shown in FIG. 14 except that a continuous inner membrane 235 is formed into spaced cavities 236 relatively much smaller than the area of respective outer envelopes 240 and such cavity is marginally welded to metallic backing foil, as later described, and has a pyrotechnic charge. The flash devices are made in a strip from seamless plastic tubing wherein each device has an outer envelope 240 demarcated between inner edges such as 243 and 247 of marginally sealed end areas and top and bottom sealed margins 248 and 249, which afford complete thermal welding around each device and which thermal welding gives entirely flat fold end panels 250 and 253 with a fold line 256 therebetween. In this instance the end wires of an ignition filament 260 in each cavity extend in opposite directions longitudinally to be in laminated engagement with a strip of aluminum or metal foil 264 disposed between membrane 235 and the rear wall of the outer envelope and welded thereto at each cavity 236. Thus, there is a metallic strip 264 extending between adjoining devices and narrowly gapped at gaps 265 medially of the cavities 236, with the membrane 235 weldingly sealed to the metallic surface marginally around each cavity. In this instance the membrane material may cross the gaps and not be pushed into them for sealing the ends. This permits gas escape by expansion into the outer envelope by passage through the gaps when pyrotechnic materials of unusual heat and pressure characteristics are employed.

The metallic strips passing into each flash device thus effect electrodes pressed against the end wires of ignition filament 260 of that device and each such metallic member is an electrode for two flash devices, extending the distance D from flash device to flash device between gaps 265, and having a transverse width D'.

By removing a small disc of material from the front and rear walls of the outer envelope to form aperture 267 at the margins 250 and 253, and an aligned aperture 268 in membrane 235, access to each of the metallic members passing into a flash bulb for electrical connection with a voltage source is had to ignite the filament. Such apertures may be provided on each side of the metallic member for convenience in making contact engagement or for insuring contact engagement by camera contacts resiliently engaging each side of the foil at both apertures. Alternatively, the apertures can be eliminated and the camera contacts can be prongs which pierce through the outer envelope from the rear, to or through the metallic strips. Accordingly, the metallic contact areas of the electrodes would always be sealed against dust and corrosion until the flash device is actually put in use in the camera.

In all of the above constructions, FIGS. 4, 5, 13—13, the metallic members not only effect heat sinks but also effect, when properly mirrored for such purpose, reflective surfaces.

What is claimed is:

1. A flash illumination device comprising flexible, transparent sheet plastic having at least a pair of opposed walls marginally secured together to provide a pyrotechnic material retaining cavity, a pyrotechnic material retained therein comprising a combustible material and a solid oxidant, said transparent sheet plastic comprising a plurality of laminations, each being a flattened tubular sleeve of plastic film to effect a multiwall envelope, plastic retainer means disposed within said envelope for retaining said pyrotechnic material in a predetermined position in said envelope and effecting at least one wall of an enclosure for retaining said pyrotechnic material, said retaining means being secured to said envelope, and means for igniting said pyrotechnic material.

2. A product as defined in claim 1 wherein said multiwall envelope comprises an inner wall and an outer wall; said inner wall being comprised of flattened plastic seamless tubing and said pyrotechnic material being sealed within said inner wall, said inner wall being secured in predetermined position to said outer wall.

3. A product as defined in claim 2 wherein said outer wall is composed of a heat shrinkable polymeric material and said inner wall is composed of a thermally stable polymeric material.

4. A product as defined in claim 2 wherein said igniting means are carried within said inner wall.

5. A product as defined in claim 1 wherein said transparent sheet plastic is comprised of a plurality of laminations each being a flattened tubular sleeve of plastic film to effect a multiwall envelope, said envelope constituting an outer envelope and an inner envelope, said inner envelope comprising flattened plastic film seamless tubing; said pyrotechnic material being retained within said inner envelope and said inner envelope being secured in predetermined position in said outer envelope.

6. A product as defined in claim 5 wherein said igniting means are retained within said inner envelope.

7. A product as defined in claim 3 wherein said outer wall comprises vinylidene chloride copolymer and said inner wall comprises polyvinyl chloride.

8. A product as defined in claim 1 wherein said pyrotechnic material comprises potassium perchlorate and zirconium powder.

9. A product as defined in claim 1 wherein said igniting means comprises electrical connection means.

10. A product as defined in claim 1 wherein said igniting means comprises means for applying thermal energy to said pyrotechnic material sufficient to ignite said pyrotechnic material.

11. A product as defined in claim 1 wherein said igniting means comprises means for percussively igniting said pyrotechnic material.

12. A product as defined in claim 1 which includes pyrotechnic material sealed in said envelope; and igniting means in said envelope for igniting said charge; and a metallic backing means in said envelope covering a substantial area of a wall thereof intermediate said wall and said pyrotechnic material to effect a heat sink.

13. A product as defined in claim 1 which includes a pyrotechnic material sealed in said envelope; and igniting means in said envelope for igniting said charge; and a reflective surface means in said envelope intermediate said pyrotechnic material and a wall of said envelope.

14. A product as defined in claim 13 wherein said reflective surface means is a surface of a metallic backing means.

15. A product as defined in claim 1 wherein said transparent sheet plastic includes reinforcing fibrous means.

16. A multiple flash illumination device arrangement comprising a strip of transparent sheet plastic having a pair of opposed walls marginally secured together to provide a plurality of spaced pyrotechnic retaining cavities, pyrotechnic material comprising a combustible material and a solid oxidant retained therein, and means for sequentially igniting said pyrotechnic material wherein individual flash illumination devices are separable from adjacent flash devices.

17. A product as defined in claim 16 wherein each of said flash devices is joined by a foldable end margin.

18. A flash illumination device comprising a flexible transparent sheet plastic envelope, said envelope comprising an outer wall of heat shrinkable polymeric material and an inner wall of thermally stable polymeric material and a pyrotechnic material retained within said inner wall, said pyrotechnic material comprising a combustible material and a solid oxidant and means for igniting said pyrotechnic material.

* * * * *